(12) United States Patent
Jonnadula et al.

(10) Patent No.: US 10,996,935 B2
(45) Date of Patent: May 4, 2021

(54) AUTOMATED TECHNOLOGY MODERNIZATION ACCELERATOR

(71) Applicant: HCL Technologies Ltd., Chennai (IN)

(72) Inventors: Shivaramesh Krishna Jonnadula, Chennai (IN); Gnanavel Singaravelu, Chennai (IN); Santhosh Kumar Dharmalingam, Chennai (IN); Ragavi Gunasekaran, Chennai (IN)

(73) Assignee: HCL TECHNOLOGIES LTD., Chennai (IN)

( * ) Notice: Subject to any disclaimer, the term of this patent is extended or adjusted under 35 U.S.C. 154(b) by 0 days.

(21) Appl. No.: 16/176,290

(22) Filed: Oct. 31, 2018

(65) Prior Publication Data

US 2019/0212992 A1 Jul. 11, 2019

(30) Foreign Application Priority Data

Jan. 9, 2018 (IN) .............................. 201841000981

(51) Int. Cl.
*G06F 8/41* (2018.01)
*G06F 8/51* (2018.01)
*G06F 8/30* (2018.01)

(52) U.S. Cl.
CPC ................ *G06F 8/447* (2013.01); *G06F 8/30* (2013.01); *G06F 8/43* (2013.01); *G06F 8/51* (2013.01)

(58) Field of Classification Search
CPC ..... G06F 8/30; G06F 8/43; G06F 8/51; G06F 8/447
USPC ........................................................ 717/137
See application file for complete search history.

(56) References Cited

U.S. PATENT DOCUMENTS

| 7,467,375 B2 * | 12/2008 | Tondreau | G06F 8/51 717/137 |
| 7,672,957 B2 * | 3/2010 | Cotichini | G06F 8/74 707/794 |
| 2002/0178290 A1 * | 11/2002 | Coulthard | H04L 29/06 709/246 |
| 2003/0226132 A1 * | 12/2003 | Tondreau | G06F 8/51 717/116 |
| 2004/0158820 A1 * | 8/2004 | Moore | G06F 8/51 717/136 |

(Continued)

OTHER PUBLICATIONS

Bassin et al., "Managing the Maintenance of Ported, Outsourced, and Legacy Software via Orthogonal Defect Classification," IEEE, 2013, 9pg. (Year: 2013).*

(Continued)

*Primary Examiner* — Ryan D. Coyer
(74) *Attorney, Agent, or Firm* — Finnegan, Henderson, Farabow, Garrett & Dunner LLP

(57) ABSTRACT

A method and system are provided for transforming legacy application(s) into target (modern) application source(s) to execute on modern technology and hardware. In one implementation, such a system identifies elements of legacy applications, generates an element tree to generate a source code functionally equivalent to that of the legacy application, but superior and modern in technology, deployable onto a distributed architecture on a hardware server cluster. The generated source code is assessed to detect and correct code defects, and test cases are generated for identifying the potential errors of the target application under development.

10 Claims, 12 Drawing Sheets

(56) References Cited

U.S. PATENT DOCUMENTS

| | | | | |
|---|---|---|---|---|
| 2005/0039173 A1* | 2/2005 | Tondreau, Jr. | ............ | G06F 8/45 717/136 |
| 2007/0067756 A1* | 3/2007 | Garza | ...................... | G06F 8/10 717/136 |
| 2015/0020051 A1* | 1/2015 | Rabinovitch | ....... | G06F 9/45537 717/124 |

OTHER PUBLICATIONS

Kontogiannis et al., "Code Migration Through Transformations: An Experience Report," ACM, 1998, 13pg. (Year: 1998).*

Varma et al., "NextGen eXtreme Porting—Structured by Automation," ACM, 2005, 7pg. (Year: 2005).*

Wang et al., "Reengineering Standalone C++ Legacy Systems into the J2EE Partition Distributed Environment," 2006, ACM, 9pg. (Year: 2006).*

Valetto et al., "Using Process Technology to Control and Coordinate Software Adaptation," IEEE, 2003, 11pg. (Year: 2003).*

* cited by examiner

AUTOMATED TECHNOLOGY MODERNIZATION ACCELERATOR

CROSS-REFERENCE TO RELATED APPLICATIONS

The present application claims priority to Indian Patent Application No. 201841000981, filed Jan. 9, 2018. The entirety of the above application is expressly incorporated herein by reference.

TECHNICAL FIELD

Embodiments of the present disclosure relate to devices and associated methods for transforming legacy application sources to modern languages, and more specifically, but not limited to, a system and method for transforming legacy applications and enabling them to deploy and execute on modern technology platforms, multi-tier architectures and distributed hardware.

BACKGROUND

The various technical divisions of an organization, irrespective of the domain, face several challenges with applications that are built and executing on legacy or obsolete technology platforms and hardware infrastructure. Such legacy technology platforms include but not limited to Visual Basic, Mainframe/COBOL (Common Business Oriented Language), PowerBuilder, OracleForms, HPS, Delphi, FoxPro, ProC etc. running on single central processing unit (CPU) with limited processing capacity, memory storage and networking interfaces.

The Information Technology Systems that are developed specially for a particular organisation have a long lifetime. Many such systems that are still in use were developed many years ago using technologies that are now obsolete.

However, these systems are still critical and are essential for the normal functioning of the organization and are called legacy systems The various challenges posed by this situation comprise:
outdated and obsolete technology imposing limitations to implement modern business and customer demands;
no support from platform vendor and lack of future roadmap for the platform;
tightly coupled with underlying hardware infrastructure;
limitations in terms of scaling of CPU processing capacity, elasticity of memory consumption, data transfer over network bus, encryption and security features;
high cost of operations and ownership (TCO) including licensing costs, infrastructure costs and maintenance costs;
longer time to implement new features/products; and
technology subject matter experts (SMEs) retiring and non-availability of skilled people.

Thus, there is a significant risk and cost involved in simply scrapping a legacy system and replacing it with a system that has been developed using modern technology as legacy systems rarely have a complete specification.

Also, during their lifetime legacy systems undergo many changes which are not always documented.

Thus, in order to remain useful, legacy systems need to be transformed into modernized systems.

Again, changing legacy systems is often expensive as:
different parts may have been implemented by different teams, and thus there is no consistent programming style;
system documentation is often out-of-date;
system structure may be corrupted by many years of maintenance;
techniques to save space or increase speed at the expense of understandability may have been used; and
file structures used may be incompatible with modernized systems.

The traditional solutions to overcome the above challenges with legacy technology platforms include:
1. replacing the legacy applications with commercial off-the-shelf (COTS) solutions;
2. re-engineering and/or re-building the applications on modern technology platforms;
3. migrating the legacy application sources to run on modern technology platforms; and
4. modernization and/or transformation of the legacy application sources to comply with modern architectures, tools, frameworks and platforms.

The inventors of the present application have performed a comparative analysis of various existing solutions.

For example, the following table compares these solution options for transforming the legacy applications based on various parameters:

| # | Parameter | Replace with COTS | Re-engineer | Migrate | Modernize |
|---|---|---|---|---|---|
| 1 | Risk | Medium | High | Low | Low |
| 2 | Cost | High | High | Low | Medium |
| 3 | Duration | Short | Long | Short | Medium |
| 4 | SME Involvement | Significant | Significant | Little | Medium |
| 5 | Vendor Lock-In | High | Low | Medium | Medium |
| 6 | Maintainability | Medium | Easy | Hard | Easy |
| 7 | Support for non-functional requirements (NFRs) | Medium | Significant | Little | Significant |

Embodiments of the present disclosure propose and transform the legacy applications with maximum optimization of at least above parameters.

For example, the Automated Technology Modernization Accelerator (ATMA) proposed by the present disclosure transforms legacy application sources to modern language and enables them deploy and execute on modern technology platform and multi-tier architecture, thus also improving non-functional qualities of the applications such as scalability, flexibility, modularity, extendibility, maintainability etc.

SUMMARY

For purposes of summarizing, certain aspects, advantages and features of the disclosure have been described herein. It is to be understood that not necessarily all such advantages may be achieved in accordance with any one particular embodiment of the disclosure. Thus, the present disclosure may be embodied or carried out in a manner that achieves or optimizes one advantage or group of advantages as taught herein without necessarily achieving other advantages as may be taught suggested herein.

It is an object of the present disclosure to transform legacy application sources to modern languages.

It is an object of the present disclosure to deploy and execute erstwhile legacy application on modern technology platforms and multi-tier architectures.

It is an object of the present disclosure to rearrange the elements of legacy application into a syntax tree and capture the inter-dependencies among such elements.

It is an object of the present disclosure to distribute the elements of the legacy application into a cluster of processors (e.g., CPUs), memory units (e.g., random access memory (RAM)), file systems, storage devices, networks, switches, routers and/or load balancers.

An embodiment of the present disclosure may provide for a Code Quality Corrector to use code quality assessment rules and apply appropriate fixes to legacy application under processing.

It is an object of the present disclosure to assess the functional quality of the transformed application at development phase by providing test cases.

All the embodiments as herein described with respect to the present disclosure are applicable to disclosed methods and corresponding systems.

These and other embodiments of the present disclosure will also become readily apparent to those skilled in the art from the following detailed description of the embodiments having reference to the attached figures, the disclosure not being limited to any particular embodiments disclosed.

BRIEF DESCRIPTION OF THE DRAWINGS

For a better understanding of the embodiments of the systems and methods described herein, and to show more clearly how they may be carried into effect, reference will now be made, by way of example, to the accompanying drawings.

DETAILED DESCRIPTION

Figure 1:
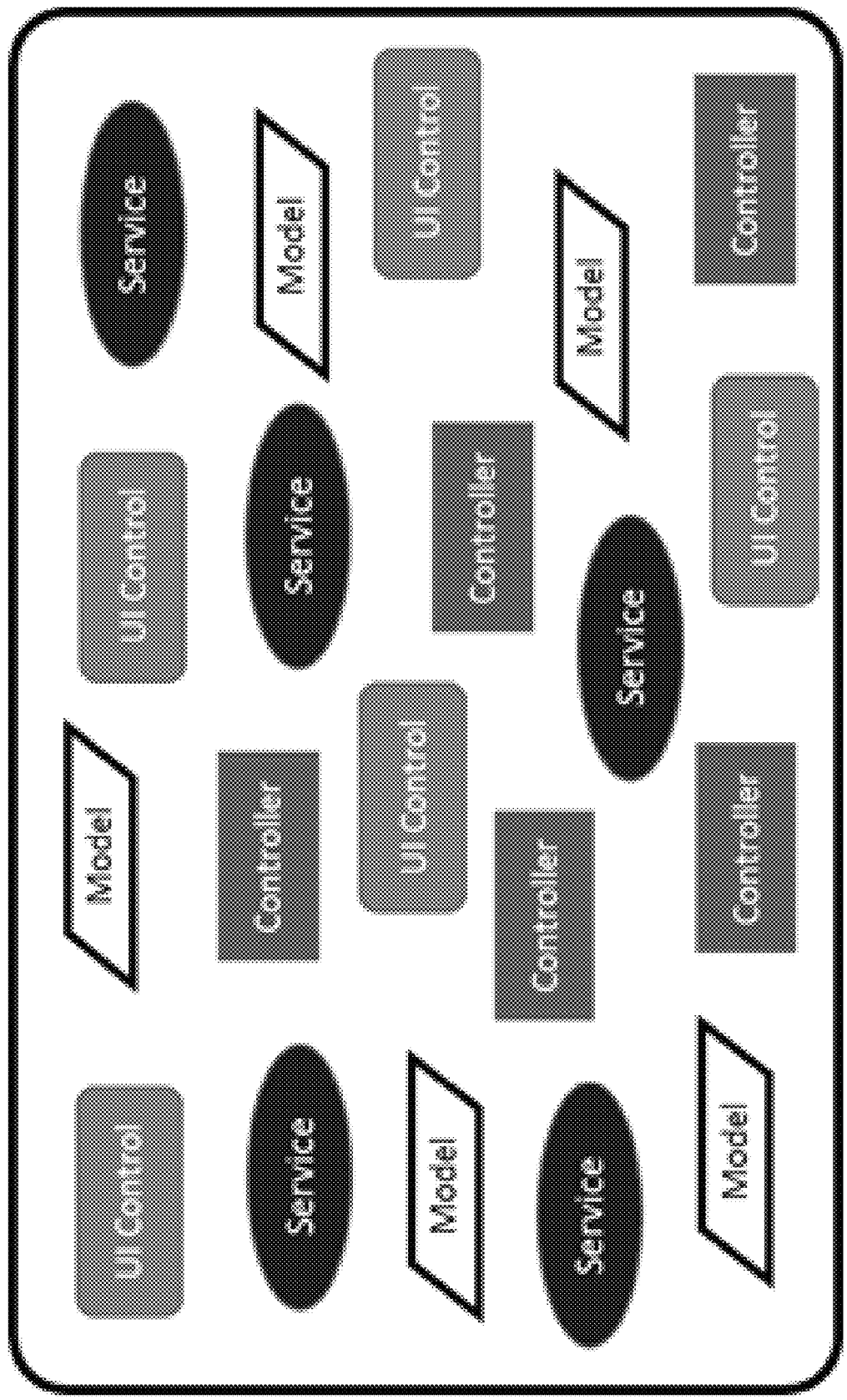
FIG. 1 illustrates a diagrammatic representation of an architectural environment in which embodiments of the present disclosure operate.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures. It should be appreciated that the functions, structures, elements and the protocols used in communication are irrelevant to the present disclosure. Therefore, they need not be discussed in more detail here.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The term "legacy technology" can refer to applications, platforms, hardware setups, programming languages and other technologies that have been superseded by newer options.

A typical legacy application comprises elements such as one or more user interface (UI) controls, one or more controller components handling the user events performed on the controls and/or navigation of pages, one or more model components representing and/or holding the data, one or more service components implementing the business logic, processing logic, data access, data transformation or the like.

These elements are usually arranged in monolithic or client server architecture and are often all tightly coupled with each other, making the application difficult to scale, maintain and/or extend.

FIG. 1 depicts typical elements 100 of a legacy application.

Such elements may include, but are not limited to
UI Control,
Model,
Service, and
Controller.

To identify such elements, an ATMA platform of the present disclosure may provide a comprehensive set of lexicons and pattern matching rules for each of the supported legacy programming languages to identify the above types of elements in the respective platforms.

Figure 2:
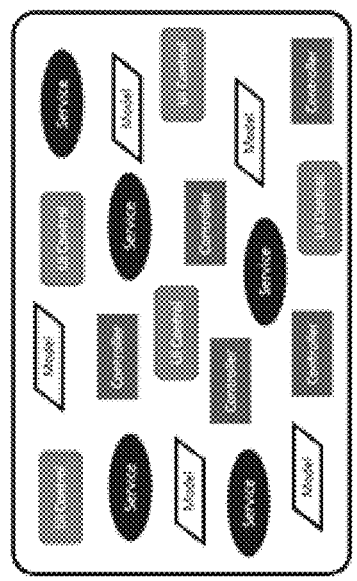
FIG. 2 illustrates an exemplary element tree generation by an ATMA abstract syntaxt tree (AST) creator of embodiments of the present disclosure.
Figure 2:
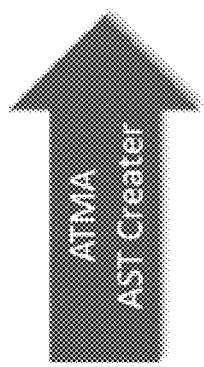
Figure 2:
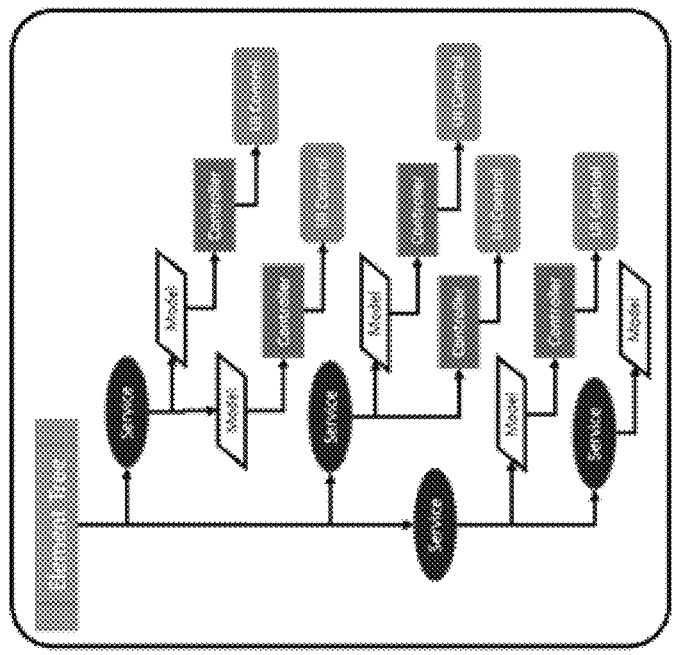

FIG. 2 illustrates an exemplary element tree generation 200 by an ATMA AST creator of embodiments of the present disclosure.

After recognizing of the elements as identified above, ATMA AST Creator builds an element tree.

One of the major objectives for rearranging identified elements is to appropriately capture the inter-dependencies among such elements.

Figure 3:
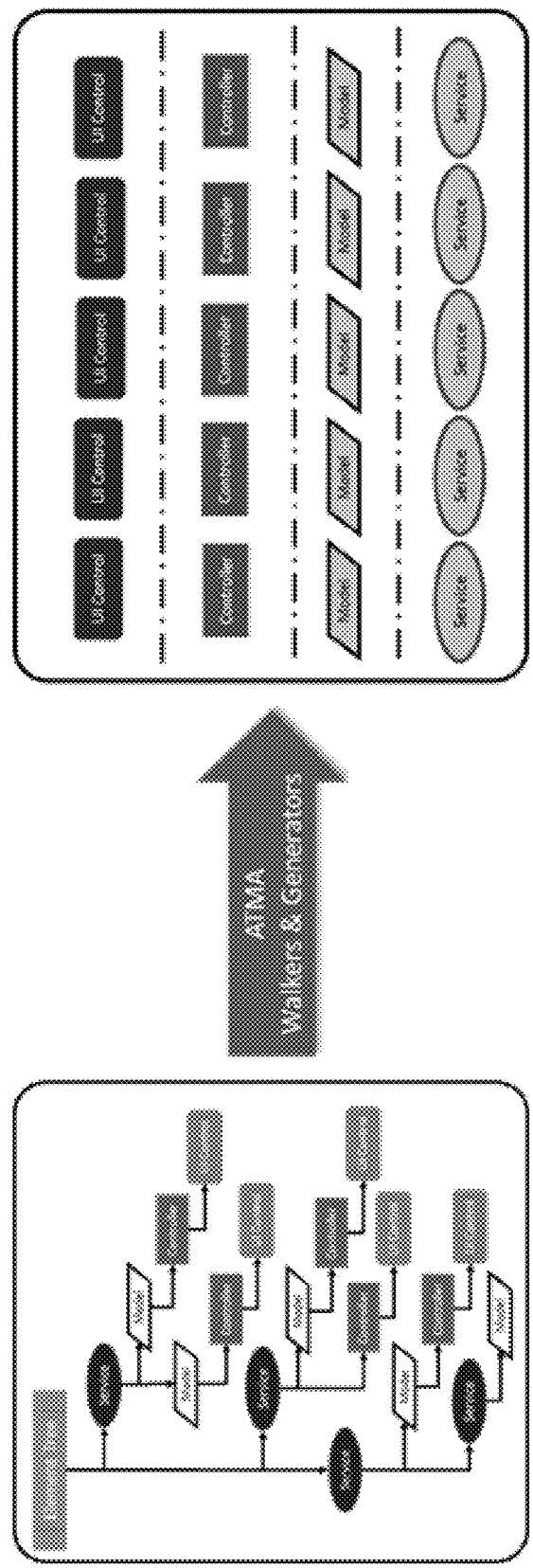
FIG. 3 illustrates an exemplary transformation of an ELEMENT TREE into TARGET SOURCE and architecture by ATMA Walkers and Generators.

FIG. 3 illustrates an exemplary transformation 300 of an Element Tree into Target source and architecture by ATMA Walkers and Generators.

The ATMA platform of the present disclosure may implement a set of "Walker" components that are specialized to filter, decompose and decouple a specific type of the elements of the tree, together with the metadata and behavior of the elements.

Each walker component may be coupled with a respective generator component. The generator component may generate source code equivalent to that of the element that is filtered, along with all its characteristics, behavior and interactions.

Figure 4:
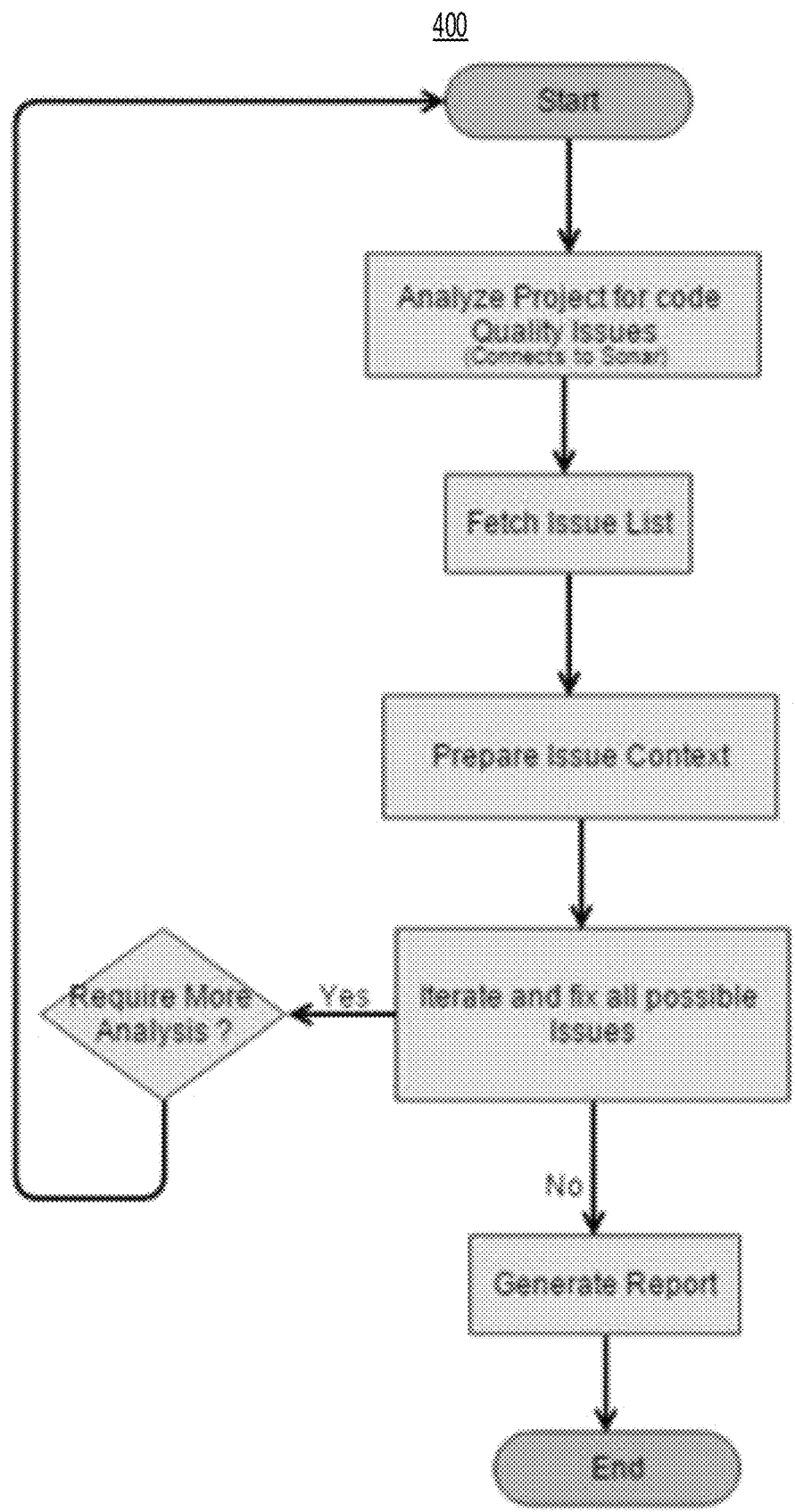
FIG. 4 illustrates an exemplary flow chart depicting code quality correction.

FIG. 4 illustrates an exemplary flow chart 400 depicting code quality correction.

The ATMA platform of the present disclosure may additionally comprise a component named "CQC (Code Quality Corrector)", capable of automatically reducing the technical debt of the transformed code in target technology platform (e.g., Java in the example depicted in FIG. 4) by automated code quality corrections.

The CQC of the present disclosure may execute static code quality analysis tools, such as Sonar or the like, to assess the technical code quality and obtain the list of code quality defects and/or violations.

In a test of one embodiment of the present disclosure, about 50% of such code quality defects were corrected by CQC without requiring any intervention to reduce the overall technical debt of the transformed application.

The CQC may have correction handlers for each type of the code quality assessment rules to apply appropriate fixes for the violations.

Figure 5:
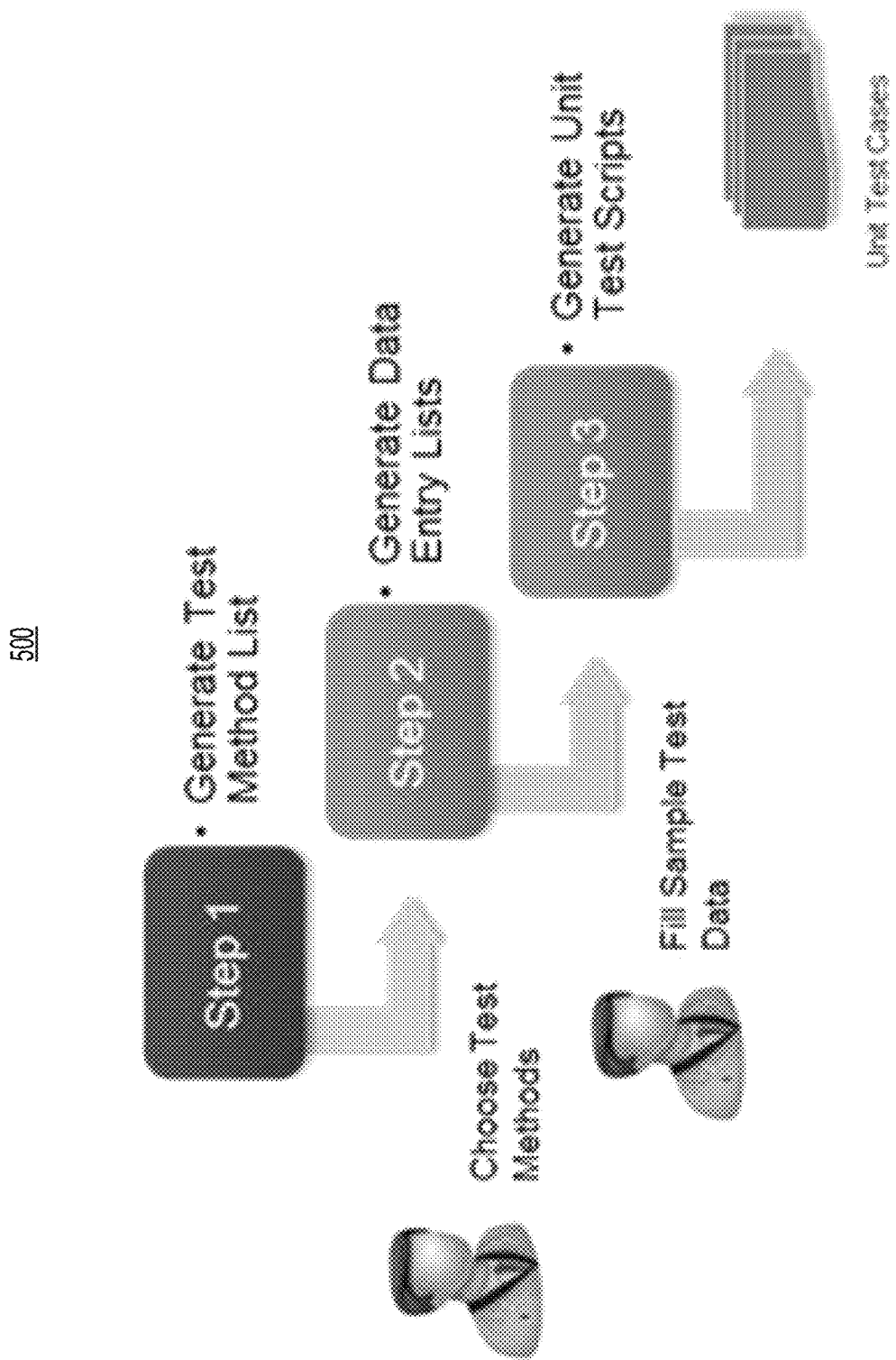
FIG. 5 illustrates an exemplary unit test generation process by an exemplary Unit Test Generation (UTGen) module of embodiments of the present disclosure.

FIG. 5 illustrates an exemplary unit test generation process 500 by an ATMA UTGen module of embodiments of the present disclosure.

The UTGen component of the ATMA platform is capable of generating a comprehensive set of unit test scripts for the selected target component or package, which can be executed on Junit, TestNG or similar platforms to assess the functional quality of the transformed application at development phase itself, which may reduce the functional debt.

Thus, the UTGen may help to identify the prospective errors of the application to be transformed at the development phase itself.

In particular, UTGen may generate unit test cases for performing unit testing of any and/or all methods of a Java Component, as depicted in the example of FIG. 5.

Accordingly, UTGen may generate a unit test method for each of the operations in the class being tested.

The generated code for each unit test case may include at least:
1. code for declaration of the operation arguments,
2. initialization of the operation arguments with values from an externalized data sets,
3. invocation of the test method using the arguments created and initialized as above,
4. validating the return values and/or object attributes against the assertion data specified in the data sets, and
5. exception handling and corresponding assertion statements.

In addition, the unit test classes may be instrumented with appropriate annotations necessary to invoke the component being tested in its deployment context, such as an Enterprise JavaBeans (EJB) container, a Spring container or the like.

UTGen may also offer capability to generate an instrumentation template for mocking some of the dependent components for unit testing in isolated environment.

Figure 6:
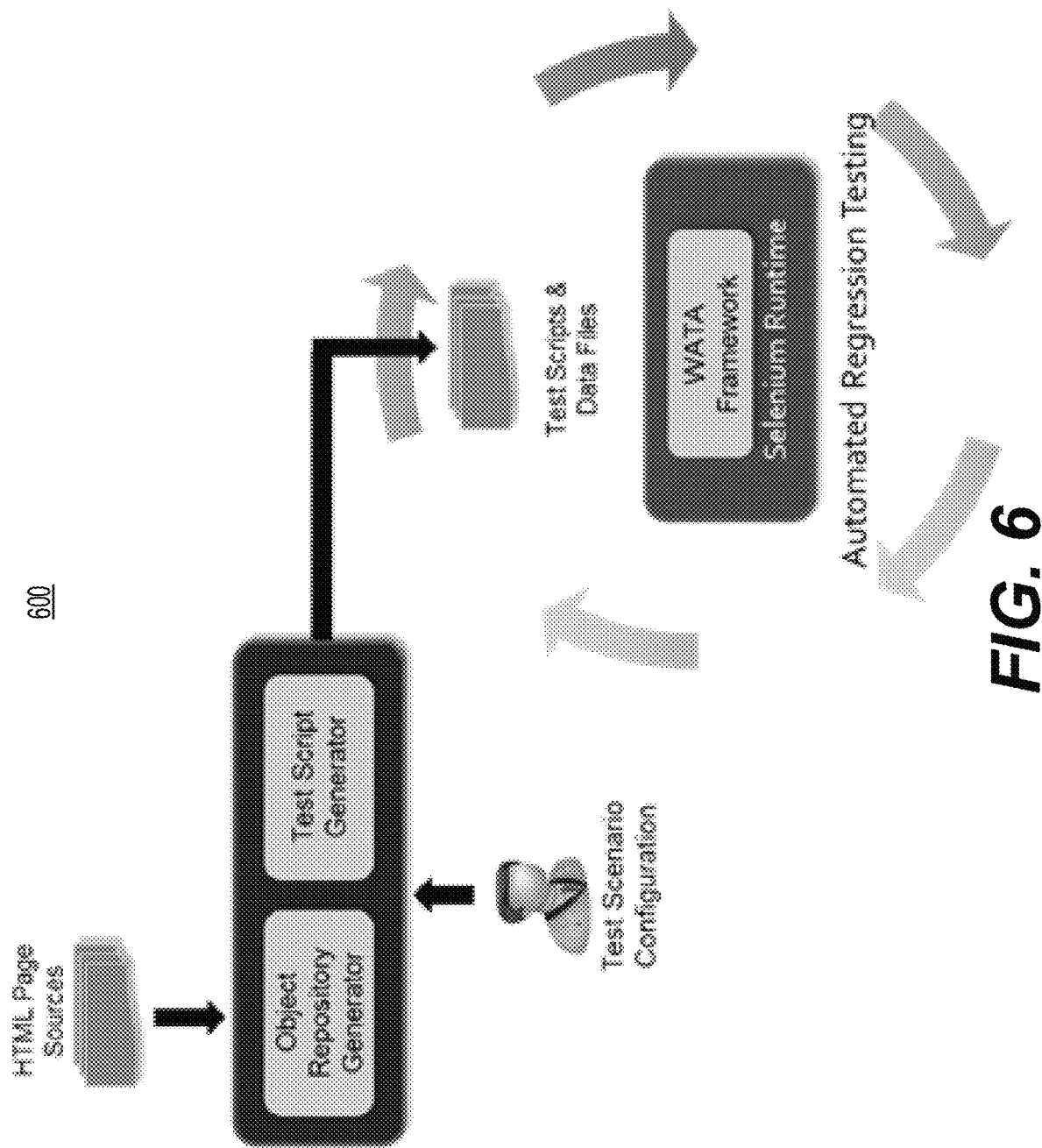
FIG. 6 illustrates an exemplary Regression Test Suite Generation (ATGen) for functional testing of the modernized applications.

FIG. 6 illustrates an exemplary Regression Test Suite Generation (ATGen) 600 for functional testing of the modernized applications.

The ATGen may comprise a component of ATMA platform that is built to provide an improved approach to functional testing of the modernized applications.

The ATGen component may allow intuitive tests to be developed and executed. For example, test engineers may use this tool to develop and generate test cases for test scenarios based on hypertext markup language (HTML) source code taken from screens in the transformed applications.

The test scripts may be highly maintainable and reusable.

The present disclosure provides a robust ATMA platform to handle transformation of multiple legacy platforms including, but not limited to, PowerBuilder, Oracle Forms, Delphi, Visual Basic, HPS, COBOL, PL/SQL, TSQL, PL1, .NET/C#, Pro-C and FoxPro.

The proposed modernization engine of ATMA may significantly improve the productivity and quality of the migration and may be extendible to support transformation of many different legacy languages and supports multiple target platforms such as Java/JEE, .NET/C#, SFDC, HTML5/AngularJS or the like.

Figure 7:
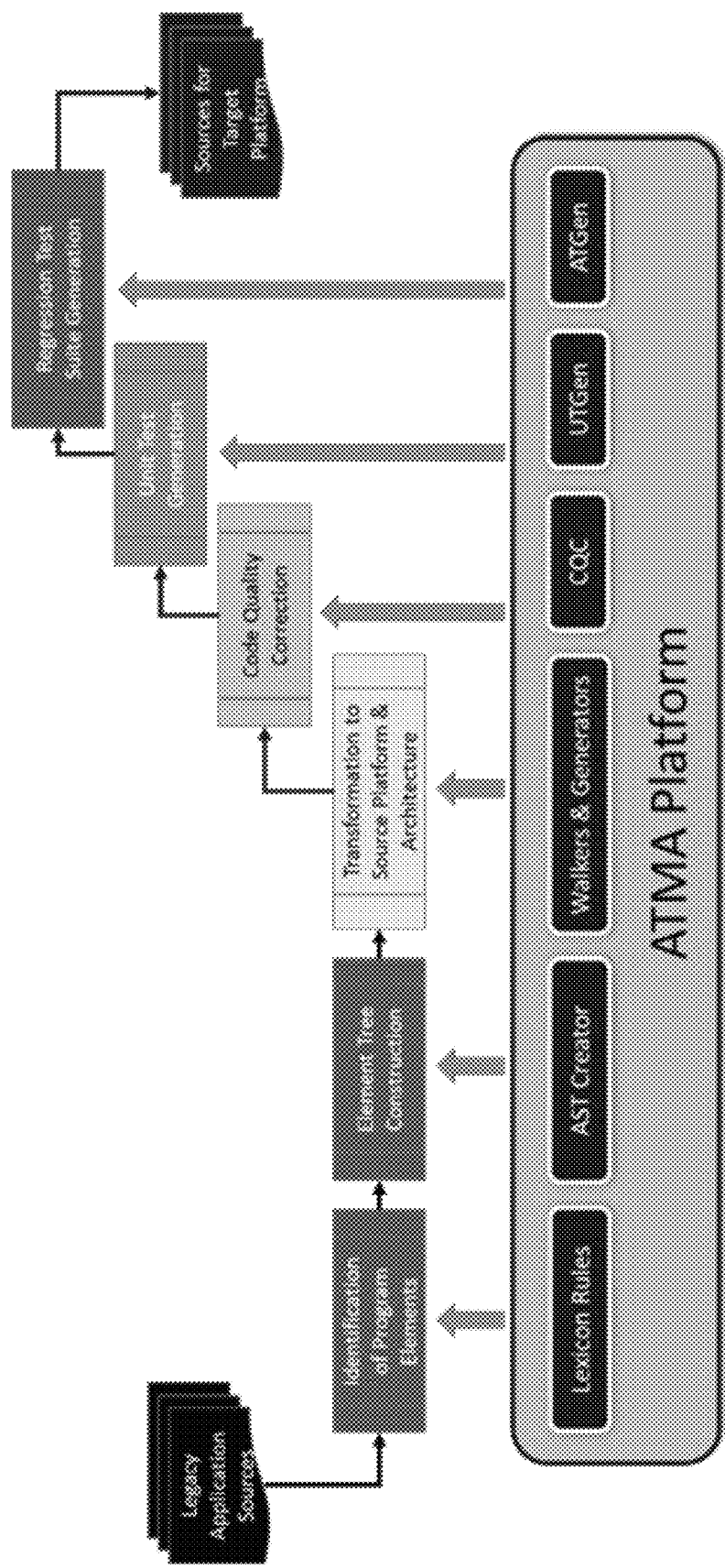
FIG. 7 illustrates an exemplary ATMA based legacy application modernization process of embodiments of the present disclosure.

FIG. 7 illustrates an exemplary ATMA based legacy application modernization process 700 of embodiments of the present disclosure.

The Automated Technology Modernization Accelerator (ATMA) of the present disclosure may help in transforming the legacy application sources to modern languages, and enabling transformed code in modern languages to be deployed and executed on modern technology platforms and multi-tier architectures, thus improving non-functional qualities of the applications, such as scalability, flexibility, modularity, extendibility, maintainability etc.

The technical solution provided by the present disclosure offers flexibility to choose from multiple architectures, implementation frameworks, deployment containers etc.

The UTGen, CQC and ATGen as described above provide unique capabilities extending automation capabilities beyond a construction phase.

Figure 8:
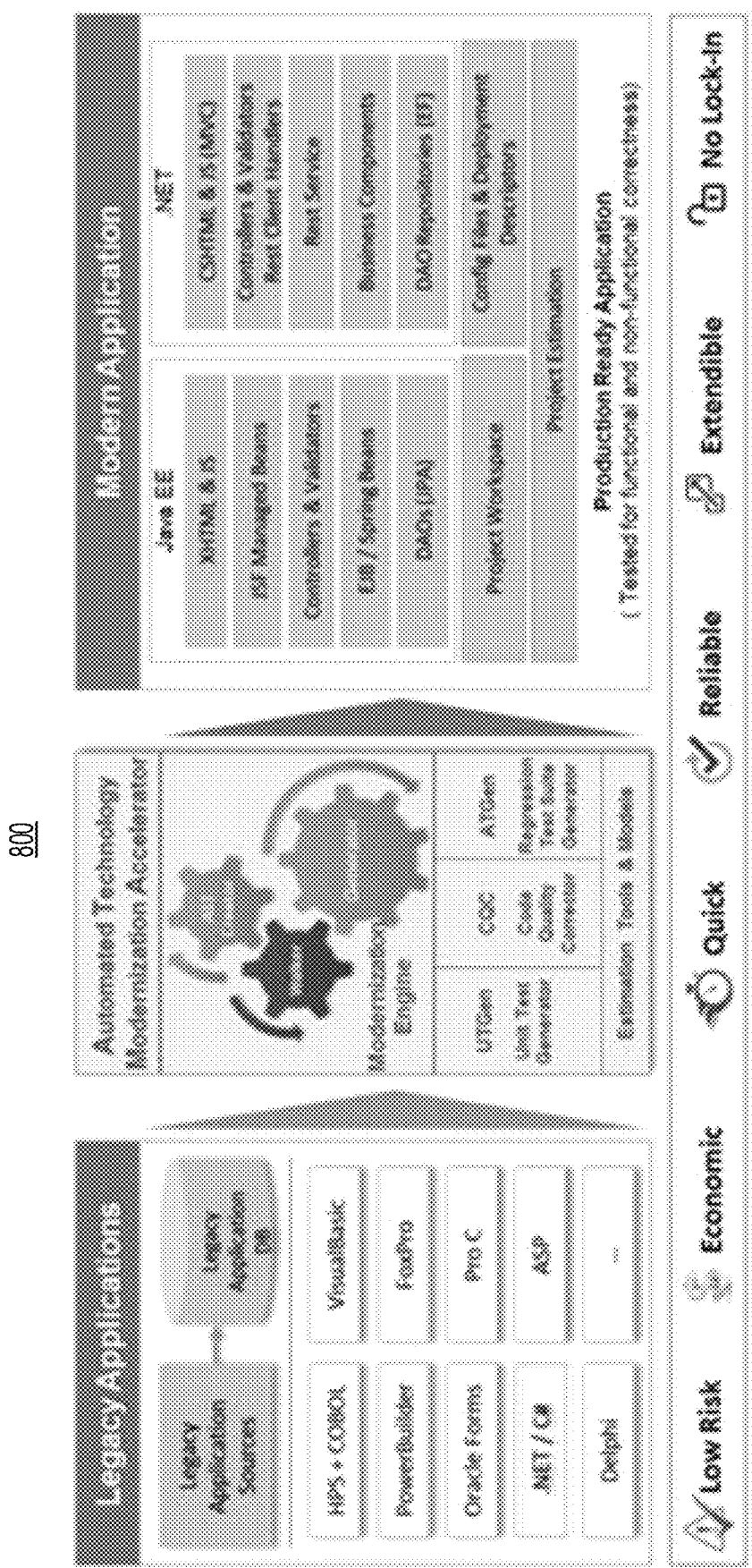
FIG. 8 illustrates an exemplary architecture model of embodiments of the present disclosure.

FIG. 8 illustrates the conceptual depiction of an ATMA based legacy application modernization process 800 of embodiments of the present disclosure.

Figure 9A:
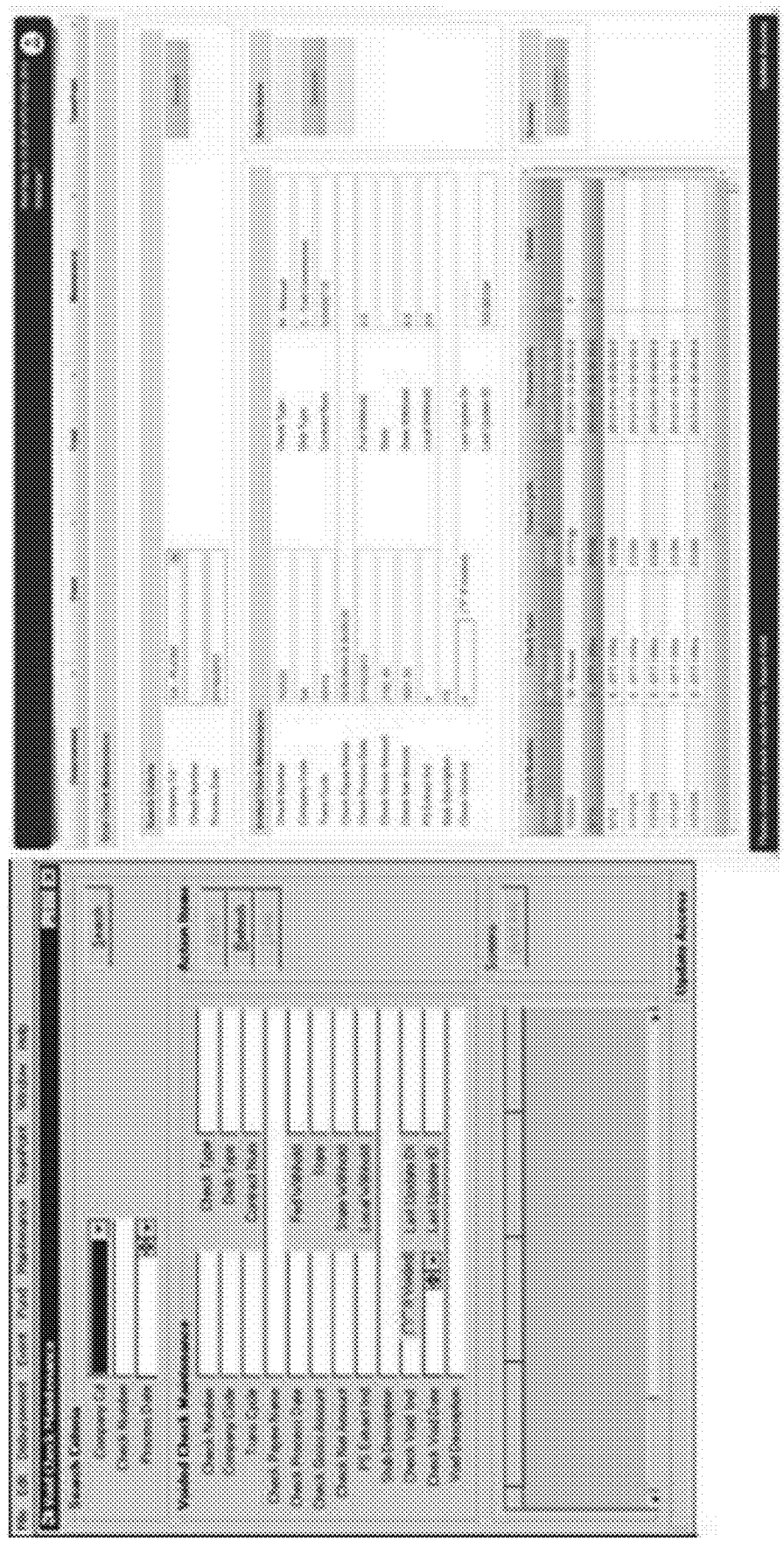
FIG. 9A illustrates an exemplary screenshot depicting a Visual Basic application before and after ATMA modernization to Java.
Figure 9B:
FIG. 9B illustrates an exemplary screenshot depicting a sample screenshot from HPS application before and after ATMA modernization to Java.
Figure 9C:
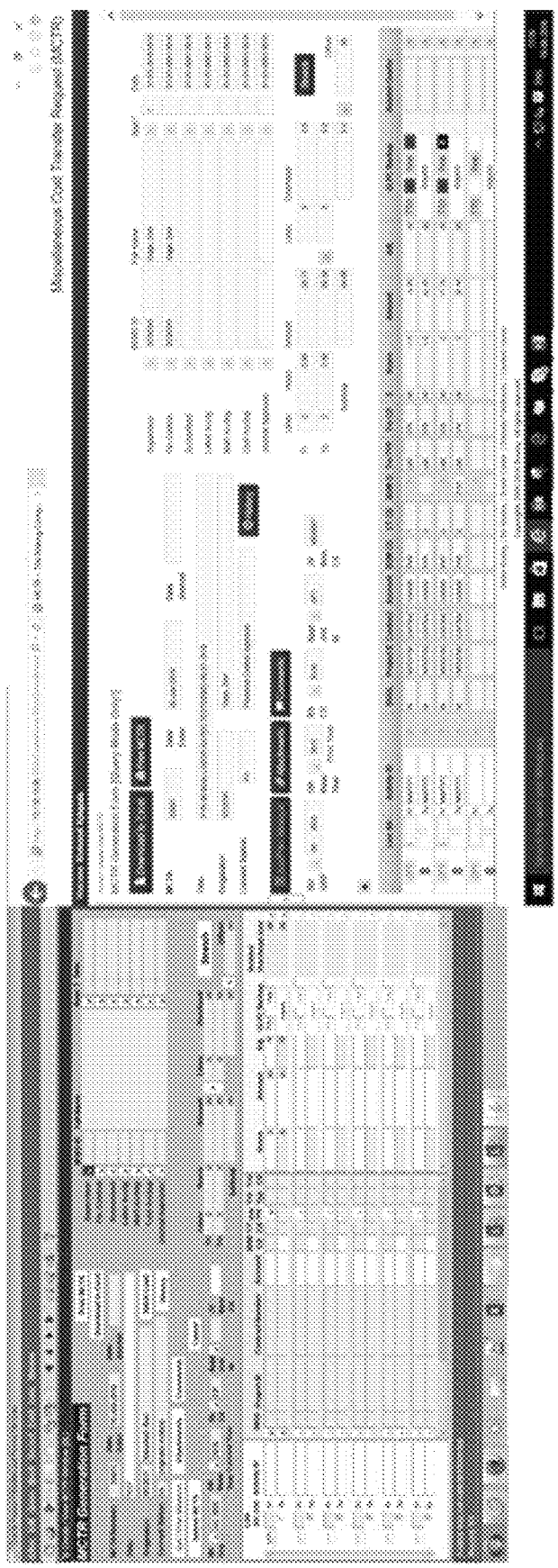
FIG. 9C illustrates an exemplary sample screenshot from Oracle Forms application before and after ATMA modernization to .NET.

FIGS. 9A, 9B and 9C present a few sample application visuals 900, 910 and 920, respectively, prior to modernization and post modernization using embodiments of the present disclosure.

Figure 10:
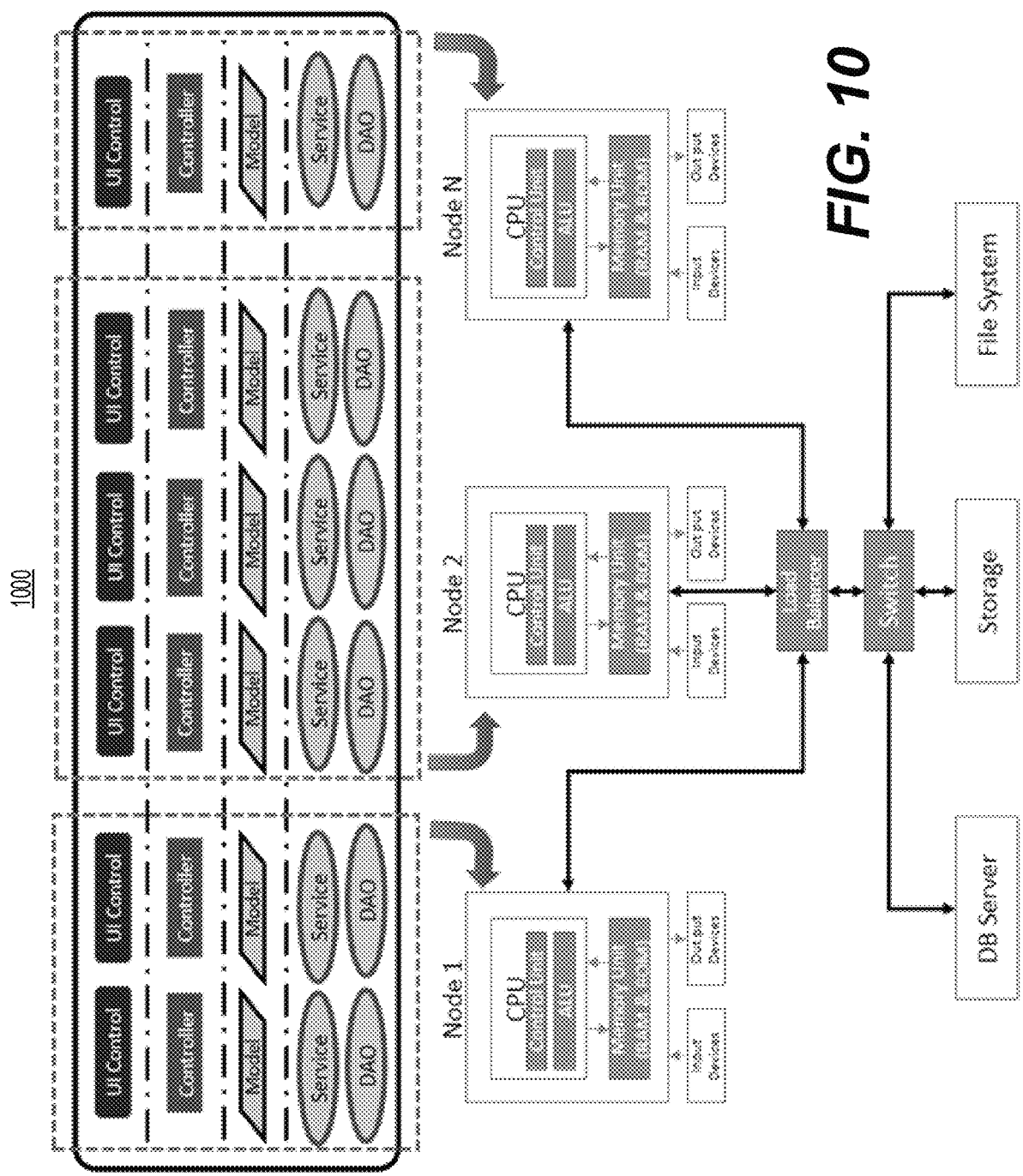
FIG. 10 illustrates an exemplary distribution of application components generated by embodiments of the present disclosure into modern hardware infrastructure.

FIG. 10 illustrate modes of distribution 1000 of streamlined legacy application elements into the modern server hardware cluster comprising CPUs, memory, input and output devices, switches, load balancers, storage devices, network components or the like in an execution environment. Each processor in the nodes of the hardware cluster may share the decoupled streamlined components generated by embodiments of the present disclosure to address scalability and performance requirements in the modern stack.

Unlike existing mere code conversion tools, embodiments of the present disclosure may provide for a comprehensive automation platform to achieve legacy modernization, handling both architecture and other non-functional characteristics.

The ATMA may significantly improve the productivity and quality of such modernization.

The ATMA may help to overcome the challenges associated with applications running on legacy technology platforms by:

eliminating the risk to business continuity due to technology obsolescence;

overcoming the risk due to the depleting number of skilled people on legacy technology by migrating to modern technologies with abundant availability of skilled experts; and assuring delivery and low risk by:
  a. requiring less involvement from business SMEs and technology SMEs,
  b. not changing a data model and using as-is business logic conversion, hence providing a minimum risk of losing functionality, and
  c. not impacting the end user experience and not requiring re-training of end users, thereby reducing impact to business continuity.

Also, as the modernized applications may be adapted to open standards on modern platforms, no proprietary tools or frameworks will be required; hence, no vendor lock-in will ensue.

Also, as the modernized applications may conform to coding standards, embodiments of the present disclosure may result in fewer defects and may decrease the cost of providing quality due to minimal rework requirements.

The present disclosure may be economical to transform legacy applications as the ATMA may a. help to achieve re-engineering through automated code transformation, thus saving, in some embodiments, more than 60% of costs and time for legacy modernization;

b. allow modernized applications to run on low cost, modern and distributed hardware and software platforms;

c. allow for low cost application maintenance due to better tools, processes and high productivity; and d. lower TCO (total cost of ownership) overall.

Modern Architecture Enabling Business Innovation a. ATMA may result in modern multi-tier architecture with well separated layers, loose coupling of components, reusability, integration and deployment capabilities, cloud enablement—all of which may help for innovation in business and IT processes.

b. Web based access, which use low footprint on user desktops, opens up scope of usability improvements.

c. ATMA may use open architecture—which supports most of the databases and application servers.

d. ATMA may be flexible to integrate with external applications, SOA/web services, distribution channels or the like.

High Quality and Consistency of Deliverables a. The output code may be consistent throughout the application, and hence easy to understand and maintain.

b. ATMA may results in fewer defects due to standardization.

Flexible and Extendible a. ATMA may support compliance with various technology implementation frameworks for the target platforms as per the requirements of customers.

b. ATMA may be extendible to add support for any additional legacy (source) and modern (target) platforms.

More than ten customer projects have been executed using above mentioned ATMA approach and the actual efforts consumed for the transformation of the three applications were compared against the estimated efforts through re-engineering approach.

The effort for re-engineering approach were estimated based on industry standard benchmark data for function point estimation of scope and productivity for the respective technology platforms. The actual effort consumed by the tested ATMA solution approach are measured and compared against the estimated approach to derive the percentage of savings achieved through the tested ATMA approach.

The following table presents the metrics from three different modernization projects executed for customers for different combinations of source and target platforms:

| Customer | Source Language (Legacy) | Lines of Code (LOC) | Function Points (Estimated based on QSM metrics) | Target Language (Modern) | Estimated Effort for Re-engineer approach (Person Days) | Actual effort consumed using ATMA Solution (Person Days) | Effort Saving (%) |
|---|---|---|---|---|---|---|---|
| Customer 1 | Visual Basic | 112,000 | 2,667 | Java/JEE | 1,778 | 1,060 | 40% |
| Customer 2 | Oracle Forms | 119,165 | 3,221 | .Net | 2,801 | 945 | 66% |
| Customer 3 | HPS/Cobol | 843,000 | 18,326 | Java/JEE | 12,217 | 4,551 | 63% |

Benchmark data used for the above estimation is below:

| Source Language (Legacy) | QSM FP Data (LoC/FP) | Target Language (Modern) | Caper Jones Productivity Factor (FP/Day) |
|---|---|---|---|
| Visual Basic | 42 | Java | 1.5 |
| Oracle Forms | 37 | .Net | 1.15 |
| HPS/Cobol | 46 | Java/J2EE | 1.5 |

What is claimed is:

1. A computer-implemented method for transforming legacy application sources into target application sources, the method comprising
 identifying elements of at least one legacy application;
 generating an element tree based on the elements to capture one or more interdependencies among the elements, wherein generating the element tree comprises:
  executing proprietary rules for detecting functional responsibilities of the elements of the at least one legacy application; and
  classifying the elements of the at least one legacy application as at least one of UI controls, controller components, model components, business logic components, business service components, or data access components;
 filtering at least a part of the elements along with associated metadata;
 generating a source code equivalent to source code of the filtered elements and compatible to deploy on a cluster of server hardware;
 assessing the generated source code to detect and correct code defects;
 identifying, using a generating unit and functional test cases, potential errors of a target application under development comprising the generated source code; and
 distributing the elements of the at least one legacy application into a cluster of: one or more processors, one or more memory units, one or more file systems, one or more storage devices, one or more networks, one or more switches, one or more routers, or one or more load balancers.

2. The method of claim 1, wherein the elements of the at least one legacy application comprise at least one of:
 a user interface (UI) control,
 a model,
 a service, or
 a controller.

3. The method of claim 1, wherein identifying the elements of the at least one legacy application comprises using one or more lexicons and pattern matching.

4. The method of claim 1, wherein generating the element tree comprises rearranging the identified elements of the at least one legacy application as a syntax tree.

5. The method of claim 1, wherein the filtering comprises decomposing and decoupling one or more elements of the element tree.

6. A system for transforming one or more legacy application sources into one or more target application sources, the system comprising:
 a processor that is coupled with a memory and configured to:
  identify elements of at least one legacy application;
  generate an element tree based on the elements to capture one or more interdependencies among the elements, wherein generating the element tree comprises:
   executing proprietary rules for detecting functional responsibilities of the elements of the at least one legacy application; and
   classifying the elements of the at least one legacy application as at least one of UI controls, controller components, model components, business logic components, business service components, or data access components;
  filter at least a part of the elements along with associated metadata;
  generate a source code equivalent to source code of the filtered elements;
  assess the generated source code to detect and correct code defects;
  identify, using a generate unit and functional test cases, potential errors of a target application under development comprising the generated source code; and distribute the elements of the legacy application into a cluster of: one or more processors, one or more memory units, one or more file systems, one or more storage devices, one or more networks, one or more switches, one or more routers, or one or more load balancers.

7. The system of claim 6, wherein the elements of the at least one legacy application comprise at least one of:

a user interface (UI) control, a model, a service, or a controller.

8. The system of claim 6, wherein identifying the elements of the at least one legacy application comprises using one or more lexicons and pattern matching.

9. The system of claim 6, wherein generating the element tree comprises rearranging the identified elements of the at least one legacy application as a syntax tree.

10. The system of claim 6, wherein the filtering comprises decomposing and decoupling one or more elements of the element tree.

\* \* \* \* \*